United States Patent Office 2,771,492
Patented Nov. 20, 1956

2,771,492

PRODUCTION OF DODECANOYL PEROXIDE

James Chapman and William Allenby Wynne, Widnes, England, assignors to Imperial Chemical Industries Limited, a corporation of Great Britain No Drawing. Application July 28, 1954,
Serial No. 446,404

Claims priority, application Great Britain August 7, 1953

7 Claims. (Cl. 260—610)

This invention relates to the manufacture of dodecanoyl peroxide ($C_{11}H_{23}CO.O.O.COC_{11}H_{23}$).

According to the present invention a process for the manufacture of dodecanoyl peroxide comprises bringing into reaction dodecanoyl chloride ($C_{11}H_{23}COCl$) with 0.4 to 4 moles of hydrogen peroxide and 0.9 to 1.5 moles of sodium hydroxide or potassium hydroxide, the hydrogen peroxide being in the form of an aqueous solution containing 20% to 60% by weight of hydrogen peroxide and the sodium hydroxide or potassium hydroxide being in the form of an aqueous solution containing 10% to 45% by weight of sodium hydroxide or 14% to 50% by weight of potassium hydroxide, at a temperature in the range $-10°$ C. to $5°$ C.

Preferably we employ 1½ to 3 moles of hydrogen peroxide and approximately 0.95 to 1.05 moles of caustic alkali per mole of dodecanoyl chloride.

In addition to the main reaction which may be represented by the equation $$2C_{11}H_{23}COCl + Na_2O_2 = (C_{11}H_{23}CO)_2O_2 + 2NaCl$$

there occurs a side reaction of dodecanoyl chloride with water to form dodecanoic acid which in turn is converted by the caustic alkali to the corresponding sodium or potassium salt of the acid. In order to favour the main reaction the process is preferably carried out in the presence of as small an amount of water as possible. We preferably employ an aqueous solution containing a high proportion of hydrogen peroxide, particularly suitable solutions being those which are easily available commercially and relatively inexpensive and contain approximately 27% to 35% by weight of hydrogen peroxide, although good results may also be obtained with solutions containing approximately 50% by weight of hydrogen peroxide.

Aqueous solutions of caustic alkalies which may suitably be employed according to the invention are those containing 30% to 35% sodium hydroxide or 35% to 40% potassium hydroxide. Aqueous solutions containing a higher proportion of caustic alkalies than these can be employed but, other conditions being the same, the reaction mixture containing such solutions will occupy a volume less than one containing the more dilute solutions of caustic alkalies. Care must be taken then that the heat developed in these reaction mixtures of lesser volume is rapidly dissipated in order to maintain the reaction at the desired temperature.

We prefer to carry out the process at a reaction temperature in the range $-8°$ C. to $-2°$ C.

The process of the invention may be carried out batchwise or in a continuous manner.

One possible method of carrying out the invention by a batch process comprises passing dodecanoyl chloride into a vessel containing a mixture of the aqueous hydrogen peroxide solution and aqueous alkali hydroxide solution. The reaction mixture is vigorously stirred and maintained at the desired temperature. The dodecanoyl peroxide which separates off as a granular solid and tends to float is then removed, suitably by filtration, washed with water and dried. If free lauric acid is present in the reaction product, an eventuality which may occur when employing in the reaction the lower molar ratios in the range 0.9 to 1.5 moles of alkali hydroxides per mole of dodecanoyl chloride, the product is suitably washed with a dilute aqueous solution of an alkali hydroxide, for example a 0.6% aqueous solution of potassium hydroxide, and then washed with water and dried. Preferably in another batchwise method aqueous alkali hydroxide solution and dodecanoyl chloride are run separately into a stirred reaction vessel containing aqueous hydrogen peroxide solution. One method of carrying out the continuous process comprises passing dodecanoyl chloride, and a mixture of aqueous hydrogen peroxide and alkali hydroxide solution continuously into a stirred reaction vessel maintained at the desired temperature. A very suitable method is one in which dodecanoyl chloride, hydrogen peroxide and alkali hydroxide solutions are fed separately and simultaneously to the said reaction vessel. The dodecanoyl peroxide is taken off at an overflow, filtered and washed, then filtered again and dried at room temperature. In the latter three processes described above in which dodecanoyl chloride and the aqueous alkali hydroxide solution (if desired in admixture with hydrogen peroxide) are passed separately into a reactor the rates of addition of reactants should be such that at all times during such addition a large molar excess of alkali hydroxide over dodecanoyl chloride is avoided and preferably during the said addition procedures the proportion of alkali hydroxide to dodecanoyl chloride should at all times be in the molar ratio of 0.95 to 1.05:1.

The following Examples illustrate but do not limit the invention, all parts being by weight.

Example I 110 parts of 27% aqueous hydrogen peroxide solution were placed in a vessel, cooled to $-5°$ C. and stirred vigorously and 2.1 parts of 37.3% aqueous potassium hydroxide solution added. 73.4 parts of the same strength potassium hydroxide solution (corresponding to a total of 28 parts of potassium hydroxide) and 109.5 parts of dodecanoyl chloride were then added concurrently during a period of 1 hour, a reaction temperature of $-5°$ C. being maintained.

Immediately addition was complete the product was filtered and washed four times with water at $20°$ C., each wash being effected by stirring with 500 parts of water for 30 minutes followed by filtration. After the final filtration the product was dried in air at room temperature for 24 hours. 94 parts of a white granular solid containing 89.2 parts of dodecanoyl peroxide representing a yield of 89.6% based on dodecanoyl chloride were obtained.

Example II 165 parts per hour of dodecanoyl chloride, 115.6 parts per hour of a 36.6% aqueous potassium hydroxide solution equivalent to 42.3 parts of potassium hydroxide, and 173 parts per hour of a 35% aqueous hydrogen peroxide solution equivalent to 60.5 parts of hydrogen peroxide were continuously run by separate inlets into a stirred reaction vessel, the reaction mixture being maintained at a temperature of $-5°$ C.

A slurry containing dodecanoyl peroxide overflowed from the reaction vessel and was filtered, the product being washed twice with water and then dried in air at a temperature of approximately $30°$ C.

132.9 parts per hour of a white granular solid containing 95% of dodecanoyl peroxide, representing a yield of 88.5% based on the dodecanoyl chloride used were obtained.

What we claim is:

1. A process for the manufacture of dodecanoyl peroxide which comprises reacting dodecanoyl chloride ($C_{11}H_{23}COCl$) with 0.4 to 4 moles of hydrogen peroxide and 0.9 to 1.5 moles of a caustic alkali selected from the group consisting of sodium hydroxide and potassium hydroxide, the hydrogen peroxide being in the form of an aqueous solution containing 20% to 60% by weight of hydrogen peroxide and the hydroxide being in the form of an aqueous solution containing 10% to 45% by weight of hydroxide when the latter is sodium hydroxide and 14% to 50% by weight of hydroxide when the latter is potassium hydroxide, at a temperature in the range of $-10°$ C. to $5°$ C.

2. A process according to claim 1 in which 1½ to 3 moles of hydrogen peroxide is employed per mole of dodecanoyl chloride.

3. A process according to claim 1 in which approximately 0.95 to 1.05 moles of caustic alkali is employed per mole of dodecanoyl chloride.

4. A process according to claim 1 in which hydrogen peroxide in the form of an aqueous solution containing 27% to 50% by weight of hydrogen peroxide is employed.

5. A process according to claim 1 in which a reaction temperature of $-8°$ C. to $-2°$ C. is employed.

6. A process according to claim 1 which comprises continually passing dodecanoyl chloride, aqueous hydrogen peroxide solution and aqueous caustic alkali solution separately and simultaneously to a reaction vessel maintained at the desired temperature and recovering the desired product.

7. A process according to claim 1 in which the aqueous solution of hydroxide contains 30% to 35% by weight of hydroxide when the latter is sodium hydroxide and 35% to 40% by weight of hydroxide when the latter is potassium hydroxide.

References Cited in the file of this patent

UNITED STATES PATENTS

| | | |
|---|---|---|
| 1,754,914 | Stoddard | Apr. 15, 1930 |

FOREIGN PATENTS

| | | |
|---|---|---|
| 334,531 | Great Britain | Aug. 27, 1930 |